United States Patent
Timmons

(10) Patent No.: US 9,151,215 B2
(45) Date of Patent: Oct. 6, 2015

(54) ARTIFICIAL ASPIRATION METHODS AND SYSTEMS FOR INCREASING ENGINE EFFICIENCY

(71) Applicant: Adam Timmons, Birmingham, MI (US)

(72) Inventor: Adam Timmons, Birmingham, MI (US)

(73) Assignee: FCA US LLC, Auburn Hills, MI (US)

( * ) Notice: Subject to any disclaimer, the term of this patent is extended or adjusted under 35 U.S.C. 154(b) by 434 days.

(21) Appl. No.: 13/632,410

(22) Filed: Oct. 1, 2012

(65) Prior Publication Data

US 2014/0090373 A1   Apr. 3, 2014

(51) Int. Cl.
| | |
|---|---|
| *F02B 33/44* | (2006.01) |
| *F02B 33/00* | (2006.01) |
| *F02B 37/00* | (2006.01) |
| *F02D 41/00* | (2006.01) |
| *F02D 23/00* | (2006.01) |
| *F02B 37/10* | (2006.01) |

(Continued)

(52) U.S. Cl.
CPC .............. *F02B 37/00* (2013.01); *F02B 37/10* (2013.01); *F02B 37/14* (2013.01); *F02B 37/16* (2013.01); *F02B 39/12* (2013.01); *F02D 23/005* (2013.01); *F02D 41/0007* (2013.01); *F02D 41/1446* (2013.01); *F02D 41/1448* (2013.01); *F02D 2009/0279* (2013.01); *F02D 2200/0414* (2013.01); *F02D 2200/0418* (2013.01); *F02D 2200/703* (2013.01); *F02M 35/108* (2013.01); *Y02T 10/144* (2013.01)

(58) Field of Classification Search
USPC .................. 60/605.1, 611–612, 607–608; 123/559.1–559.3, 561
See application file for complete search history.

(56) References Cited

U.S. PATENT DOCUMENTS

| | | | | |
|---|---|---|---|---|
| 4,453,524 A | * | 6/1984 | Lee ................................. | 123/565 |
| 4,774,811 A | * | 10/1988 | Kawamura ..................... | 60/608 |

(Continued)

FOREIGN PATENT DOCUMENTS

| | | |
|---|---|---|
| GB | 2090913 A | 7/1982 |
| JP | S58222919 A | 12/1983 |

(Continued)

OTHER PUBLICATIONS

International Search Report and Written Opinion dated Dec. 13, 2013 for International Application No. PCT/US2013/056824, International Filing Date Aug. 27, 2013.

*Primary Examiner* — Thai Ba Trieu
(74) *Attorney, Agent, or Firm* — Ralph E. Smith

(57) ABSTRACT

Artificial aspiration methods and systems for increasing engine efficiency and or power. The methods include determining an engine operation status, determining an artificial aspiration goal value based on the engine operating status, determining an artificial aspiration system configuration based on the artificial aspiration goal value and the engine operating status, and configuring the artificial aspiration system to obtain the determined artificial aspiration system configuration. The system includes a plurality of sensors for sensing characteristics of an operating engine, and an artificial aspiration control unit comprising a processor connected to receive the sensed characteristics of the engine. On one example, the processor is configured to determine the engine operating status, determine an artificial aspiration goal value based on the engine operating status, determine an artificial aspiration system configuration based on the artificial aspiration goal value and the engine operating status, and configure the artificial aspiration system to obtain the determined artificial aspiration system configuration.

16 Claims, 2 Drawing Sheets

(51) Int. Cl.
   *F02B 37/14* (2006.01)
   *F02B 37/16* (2006.01)
   *F02B 39/12* (2006.01)
   *F02M 35/108* (2006.01)
   *F02D 41/14* (2006.01)
   *F02D 9/02* (2006.01)

(56) References Cited

U.S. PATENT DOCUMENTS

| | | | |
|---|---|---|---|
| 6,216,458 B1 * | 4/2001 | Alger et al. | 60/605.2 |
| 6,883,324 B2 * | 4/2005 | Igarashi et al. | 60/608 |
| 7,137,253 B2 * | 11/2006 | Furman et al. | 60/608 |
| 7,174,714 B2 * | 2/2007 | Algrain | 60/608 |
| 7,762,068 B2 * | 7/2010 | Tabata et al. | 60/608 |
| 2010/0107632 A1 * | 5/2010 | Wu et al. | 60/608 |
| 2012/0090319 A1 | 4/2012 | Mond et al. | |
| 2012/0186249 A1 * | 7/2012 | Guzzella et al. | 60/612 |
| 2012/0285165 A1 * | 11/2012 | Han et al. | 60/605.2 |

FOREIGN PATENT DOCUMENTS

| | | | | |
|---|---|---|---|---|
| WO | 97/18388 A1 | 5/1997 | | |
| WO | 99/17008 A1 | 4/1999 | | |
| WO | 00/32917 A1 | 6/2000 | | |
| WO | 2004/025097 A1 | 3/2004 | | |
| WO | WO 2011015336 A1 * | 2/2011 | | F02B 21/00 |

* cited by examiner

ARTIFICIAL ASPIRATION METHODS AND SYSTEMS FOR INCREASING ENGINE EFFICIENCY

FIELD

The present disclosure relates generally to engine control and particularly to using artificial aspiration systems to increase engine efficiency.

BACKGROUND

Presently, the power-to-weight ratio of internal combustion engines can be improved using artificial aspiration to supplement the engine air intake manifold pressure. Traditional artificial aspiration methods include driving components directly from the engine or from exhaust pressure. When the engine is operating at low speeds or the exhaust temperature is not at design temperature, there may be insufficient artificial aspiration to operate the engine efficiently. Accordingly, there is a need and desire for improved artificial aspiration methods and systems.

SUMMARY

In various example embodiments, the present disclosure provides artificial aspiration methods and systems for maximizing engine efficiency. The method includes determining the engine operating status and determining an artificial aspiration goal value based on the engine operating status. The method also includes determining an artificial aspiration system configuration based on the artificial aspiration goal value and the engine operating status and configuring the artificial aspiration system to obtain the determined artificial aspiration system configuration.

One such embodiment comprises determining the engine status by evaluation of one or more of: an air intake temperature, an engine rotation speed, an exhaust pressure, an exhaust temperature, an engine torque, an atmospheric pressure, and an atmospheric humidity. Furthermore, the engine status may be determined by an engine or sensor signal flag supplied by another engine control or status system.

In one aspect of the method, the artificial aspiration system configuration is determined based on the artificial aspiration goal value and the engine status such that engine fuel usage is minimized and or power is maximized depending on implementation preference. The method may further comprise determining a system configuration comprising a supercharger. The supercharger may be an electrical-mechanical hybrid supercharger. Generally, the hybrid supercharger may comprise a clutch such that the supercharger fan may operate on both electrical and mechanical inputs. In another embodiment, the determined system configuration will have independent values for the mechanical and electrical inputs to the supercharger fan. The method may further include determining a system configuration comprising a turbo booster. The turbo booster may have a turbo brake and a turbo bypass. In another example, the method comprises determining a system configuration comprising at least one aspiration source control valve configured to allow balancing or isolation of the artificial aspiration sources.

In one such embodiment, configuring the artificial aspiration system to obtain the artificial aspiration system configuration comprises controlling one or more of: a supercharger clutch, a supercharger electric motor, a turbo brake, a turbo bypass, and an aspiration source control valve.

Disclosed herein is an artificial aspiration efficiency system. The efficiency system includes an artificial aspiration system comprising a plurality of sensors for sensing characteristics of an operating engine and an artificial aspiration control unit comprising a processor connected to receive the sensed characteristics of the engine.

In one example the processor is configured to determine the engine operating status, determine an artificial aspiration goal value based on the engine operating status, determine an artificial aspiration system configuration based on the artificial aspiration goal value and the engine operating status, and configure the artificial aspiration system to obtain the determined artificial aspiration system configuration. The engine status may be determined by evaluating one or more of: an air intake temperature, an engine rotation speed, an exhaust pressure, an exhaust temperature, an engine torque, an atmospheric pressure, an atmospheric humidity, and engine status signal flags.

In another example the processor may be further configured such that the artificial aspiration system configuration is determined such that engine fuel usage is minimized and or power is maximized depending on implementation preference.

The artificial aspiration system may comprise a supercharger. In one embodiment, the supercharger may be an electrical-mechanical hybrid supercharger. Generally, the hybrid supercharger may comprise a clutch such that the supercharger fan may operate on mechanical input. In another example, the artificial aspiration system comprises a turbo booster that may have a turbo brake and a turbo bypass. The artificial aspiration system may further comprise at least one aspiration source control valve configured to allow balancing or isolation of the artificial aspiration sources.

In another embodiment the artificial aspiration system is configured by controlling one or more of: a supercharger clutch, a supercharger electric motor, a turbo brake, a turbo bypass, and an aspiration source control valve.

Further areas of applicability of the present disclosure will become apparent from the detailed description, drawings and claims provided hereinafter. It should be understood that the detailed description, including disclosed embodiments and drawings, are merely exemplary in nature intended for purposes of illustration only and are not intended to limit the scope of the invention, its application or use. Thus, variation that do not depart from the gist of the invention are intended to be within the scope of the invention.

DETAILED DESCRIPTION

In one form, the present disclosure provides a method of increasing the efficiency and or power of an engine using an artificial aspiration system. Artificial aspiration of an engine is desired because it provides for a higher power-to-weight ratio thereby, reducing the size of an engine necessary to output the same amount of power. However, creating the artificial aspiration pressure places additional load on the engine that may not be efficiently handled based on the status of the engine speed, temperature, or other operating or environmental factors.

Thus, as described below in more detail and in accordance with the disclosed principles, an engine operating status is evaluated to determine an artificial aspiration goal value based on the current operating characteristics of the engine. After the system determines the artificial aspiration goal value, the various artificial aspiration system configurations may then be evaluated to determine which configuration would be most efficient based on the current environmental conditions and operating characteristics of the engine. The artificial aspiration system is then controlled and placed into the efficient configuration and the steps may be repeated, as desired.

Figure 1:
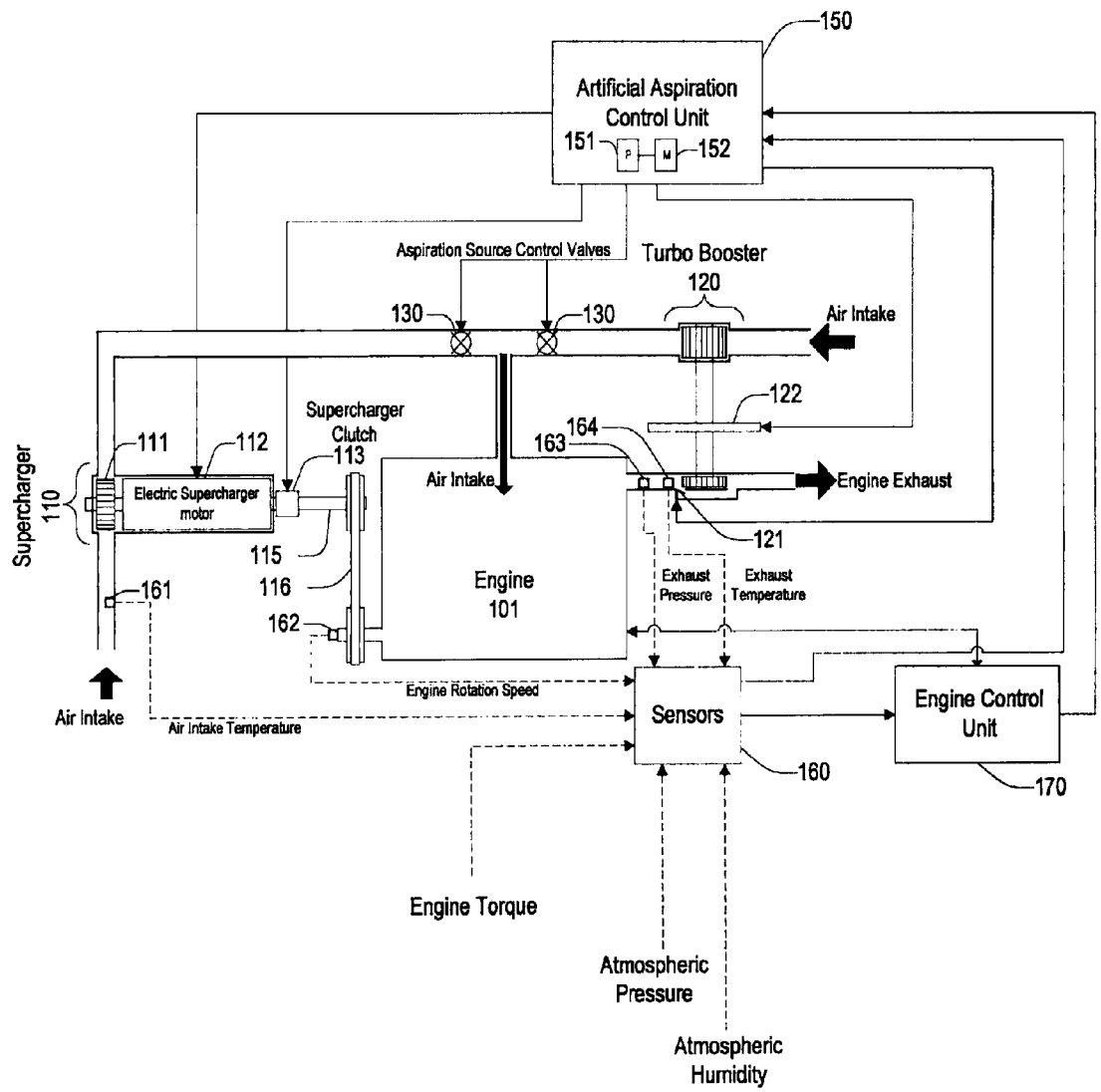
FIG. 1 is a schematic of an artificial aspiration efficiency system in accordance with the present disclosure.

FIG. 1 illustrates an example artificial aspiration efficiency system 100 that comprises an engine 101 and a plurality of sensors 160. A single system sensor 160 block is shown, but it should be understood that sensor information may come from multiple independent sensors throughout the system including additional sensors or signals not shown. The sensors 160 may include at least an air intake temperature sensor 161, an engine rotation speed sensor 162, an exhaust pressure sensor 163, and an exhaust temperature sensor 164. Sensors 161, 162, 163, and 164 are shown to illustrate where individual sensors may be located within artificial aspiration efficiency system 100 and are together represented as sensors 160. The sensors 160 may also include at least an engine torque sensor, an atmospheric pressure sensor, and an atmospheric humidity sensor. The sensors may be connected to an engine control unit 170 that may collect information from the sensors 160 and generate signal flags based on inputs from the sensors 160 and engine 101.

The artificial aspiration efficiency system 100 may further comprise a supercharger 110, a turbo booster 120, aspiration source control valves 130, and an artificial aspiration control unit 150. The artificial aspiration control unit 150 comprises a processor (P) 151 connected to a memory (M) 152, but it should be understood that artificial aspiration control unit 150 may comprise any programmable controller configured as described herein. Multiple aspiration source control valves 130 are shown, but it should be understood that a single valve capable of blending or isolating multiple aspiration sources may also be used. As an example, the aspiration source control valves 130 could be capable of reacting to reconfiguration either by reacting passively to changes in pressure, such as check valves, or actively by control signals from the artificial aspiration control unit 150, such as solenoid or motor operated valves.

In one example, the supercharger 110 is an electrical-mechanical hybrid supercharger comprising both a mechanical drive source 115 and an electric supercharger motor 112 drive source to a supercharger fan 111. Mechanical drive source 115 may be driven by a belt 116 or other mechanical linkage (not shown) connected to the engine 101. The supercharger 110 may further comprise a clutch 113. In one example, clutch 113 is a centripetal clutch configured to transfer the input load of the supercharger fan 111 from the electric supercharger motor 112 to the mechanical drive source 115 as the rotational speed of the mechanical drive source 115 increases. In another example, the clutch 113 is a computer controlled clutch configured to allow independent contribution of the mechanical drive source 115 and the electric supercharger motor 112 to the driving power of supercharger fan 111. In another example, the clutch 113 is configured to allow only electric supercharger motor 112 input to the supercharger fan 111, only mechanical drive source 115 input to the supercharger fan 111, or any combination of electric supercharger motor 112 and mechanical drive source 115 inputs to the supercharger fan 111.

The turbo booster 120 may comprise a turbo brake 122 and a turbo bypass 121. The turbo bypass 121 may be separate exhaust piping that bypasses the turbo booster or it may be a vane bypass system within the turbo booster 120. The turbo bypass 121 may be configured to reduce exhaust back pressure when the turbo booster 120 is not in use.

In one example, the artificial aspiration control unit 150 includes connections from the sensors 160. In another example, the artificial aspiration control unit 150 includes connections from the engine control unit 170 or other vehicle status systems (not shown). The artificial aspiration control unit 150 is further connected to and configured to control at least one of: the electric supercharger motor 112, supercharger clutch 113, turbo bypass 121, turbo brake 122, and/or aspiration source control valves 130.

Figure 2:
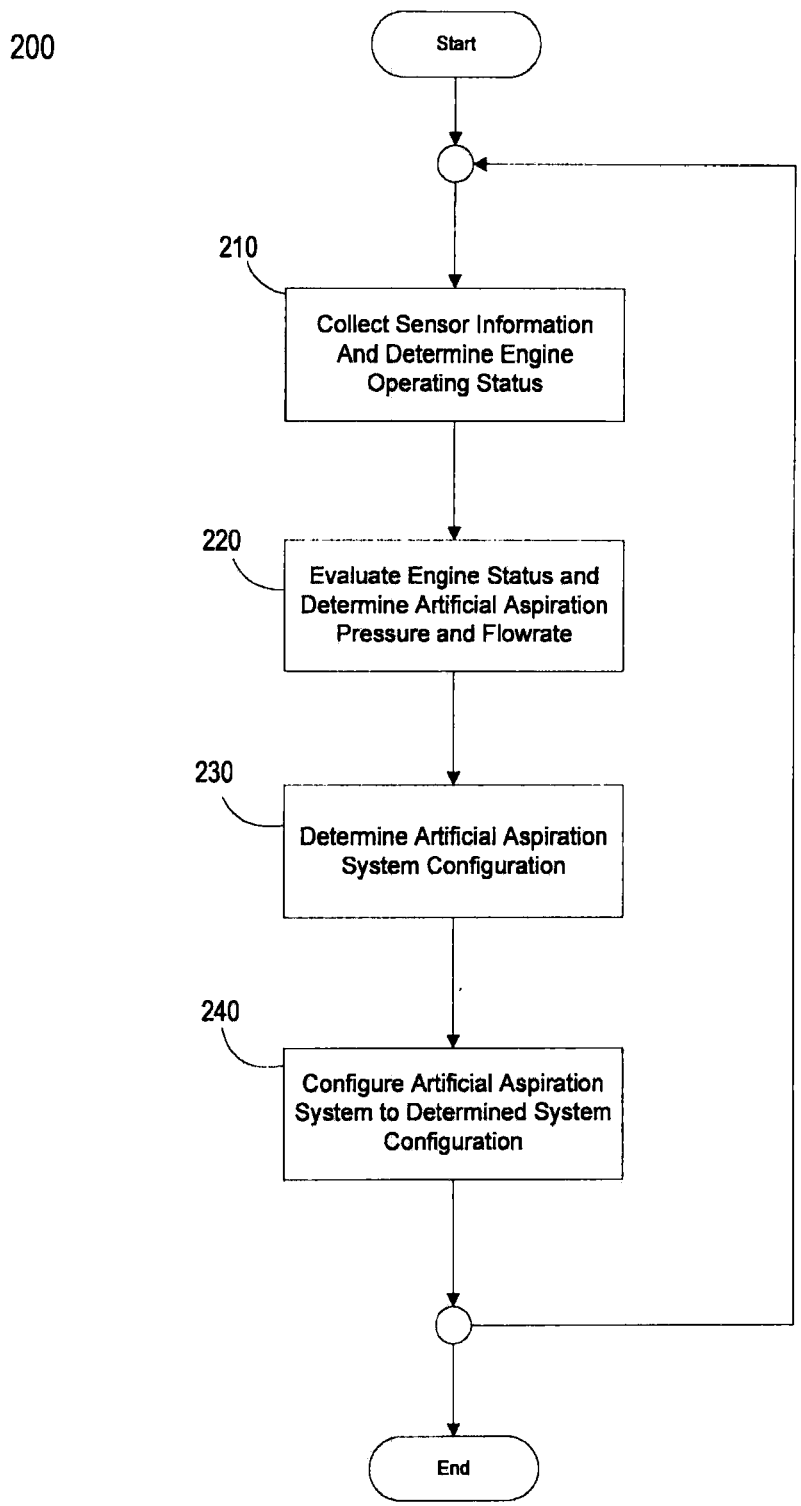
FIG. 2 is a flow diagram of a method of increasing efficiency in an engine according to the principles of the present disclosure.

FIG. 2 shows a flowchart of a method 200 performed by the artificial aspiration control unit 150 for increasing efficiency in the engine 101. At step 210, the engine 101 operating status is determined by collecting information from sensors 160 and/or engine control unit 170. The engine operating status may include operational information such as engine rotation speed, engine torque, and exhaust pressure and temperature, or it may include atmospheric information such as atmospheric pressure, atmospheric humidity, and air intake temperature. At step 220, the engine operating status is evaluated and an artificial aspiration goal value is determined based on the engine operating status determined at step 210. In one example, the artificial aspiration goal value is a combination of artificial aspiration pressure and flow rate.

The method continues at step 230 where an artificial aspiration system configuration is determined based on the artificial aspiration goal value and the engine operating status. In one example, the system configuration will be a combination of electric supercharger motor 112 current and voltage, supercharger clutch 113 position, turbo bypass 121 position, turbo brake 122 force, and the position of aspiration source control valves 130 such that engine efficiency is maximized. It should be understood, however, that not all system components are required to realize a gain in efficiency. In one example, engine efficiency is maximized by selecting the system configuration that obtains the artificial aspiration goal value with the least energy input thereby requiring the least amount of fuel for the desired power output. At step 240, the artificial aspiration system is configured into the configuration determined at step 230.

As can be seen, by determining an artificial aspiration system configuration based on engine operating characteristics, the engine will always be operating efficiently by using an artificial aspiration system configuration that places the least additional load on the engine given the target artificial aspiration goal value.

The invention claimed is:

1. A method of increasing efficiency in an engine with an artificial aspiration system comprising an electrical-mechanical supercharger, a turbo booster, and an artificial aspiration control unit including non-transitory instructions executable of:

determining an operating status of the engine, the operating status comprising at least a speed of the engine;

determining a desired amount of artificial aspiration for the engine, and an optimization of the artificial aspiration based on the engine operating status;

wherein the optimization of the artificial aspiration is provided by:

(i) the electrical-mechanical supercharger via electrical power, (ii) the electrical-mechanical supercharger via mechanical power, and
(iii) the turbo booster, to achieve the desired amount of the artificial aspiration, and
wherein the optimization of the artificial aspiration corresponds to a lowest relative fuel consumption by the engine; and
controlling at least one of the electrical-mechanical supercharger and the turbo booster of the artificial aspiration system based on the optimization of the artificial having been determined.

2. The method of claim 1, wherein the determining the engine operating status further includes determining at least one of an air intake temperature, an exhaust pressure, an exhaust temperature, an engine torque, an atmospheric pressure, an atmospheric humidity, and engine status signal flags.

3. The method of claim 1, wherein the electrical-mechanical supercharger comprises a clutch configured to enable mechanical input to an electrical-mechanical supercharger fan.

4. The method of claim 3, wherein the turbo booster further comprises a turbo brake and a turbo bypass vane.

5. The method of claim 4, wherein the artificial aspiration system further comprises at least one of aspiration source control valves configured to allow balancing of air-intake artificial aspiration sources.

6. The method of claim 5, wherein controlling the artificial aspiration system further comprises controlling one or more of the electrical-mechanical supercharger clutch, an electric motor of the electrical-mechanical supercharger, the turbo brake, the turbo bypass vane, and the at least one of the aspiration source control valves.

7. The method of claim 6, wherein:
controlling the electrical-mechanical supercharger clutch, the turbo bypass vane, and the at least one of the aspiration source control valves includes controlling a position of the electrical-mechanical supercharger clutch, a position of the turbo bypass vane, and a position of the at least one of the aspiration source control valves;
controlling the electrical-mechanical supercharger electric motor includes controlling current and voltage to the electrical-mechanical supercharger electric motor; and
controlling the turbo brake includes controlling a force of the turbo brake.

8. An artificial aspiration efficiency system for an engine, the artificial aspiration efficiency system comprising:
an artificial aspiration system comprising an electrical-mechanical supercharger and a turbo booster; and
an artificial aspiration control unit comprising at least one processor including non-transitory instructions executable to:
determine an operating status of the engine, the operating status comprising at least a speed of the engine, determine
a desired amount of artificial aspiration for the engine, and an optimization of artificial aspiration based on the engine operating status,
wherein the optimization of the artificial aspiration is provided by:
(i) the electrical-mechanical supercharger via electrical power,
(ii) the electrical-mechanical supercharger via mechanical power, and
(iii) the electrical-mechanical turbo booster, to achieve the desired amount of artificial aspiration, and
wherein the optimization of the artificial aspiration corresponds to a lowest relative fuel consumption by the engine; and
control at least one of the electrical-mechanical supercharger and the turbo booster of the artificial aspiration system based on the optimal optimization of the artificial aspiration having been determined.

9. The artificial aspiration efficiency system of claim 8, wherein the engine operating status further comprises at least one of an air intake temperature an exhaust pressure, an exhaust temperature, an engine torque, an atmospheric pressure, and atmospheric humidity, and engine status signal flags.

10. The artificial aspiration efficiency system of claim 8, wherein the electrical-mechanical supercharger further comprises a clutch configured to enable mechanical input to an electrical-mechanical supercharger fan.

11. The artificial aspiration efficiency system of claim 10, wherein the turbo booster further comprises a turbo brake and a turbo bypass vane.

12. The artificial aspiration efficiency system of claim 11, wherein the artificial aspiration system further comprises at least one of aspiration source control valves configured to allow balancing of the artificial aspiration sources.

13. The artificial aspiration efficiency system of claim 12, wherein the at least one processor controls the artificial aspiration system by controlling one or more of the electrical-mechanical supercharger clutch, an electric motor of the supercharger, the turbo brake, the turbo bypass vane, and the at least one of the aspiration source control valves.

14. The artificial aspiration efficiency system of claim 13, wherein:
the at least one processor controls each of the electrical-mechanical supercharger clutch, the turbo bypass vane, and the at least one of the aspiration source control valves by controlling a position of the electrical-mechanical supercharger clutch, a position of the turbo bypass vane, and a position of the at least one of the aspiration source control valves;
controls the electrical-mechanical supercharger electric motor by controlling current and voltage to the electrical-mechanical supercharger electric motor; and
controls the turbo brake by controlling a force of the turbo brake.

15. An artificial aspiration system for an engine of a vehicle, the system comprising:
an electrical-mechanical supercharger configured to provide artificial aspiration to the engine and configured to be powered by both (i) and electric motor and (ii) the engine, the electrical-mechanical supercharger comprising a clutch configured to selectively couple to the engine;
a turbocharger configured to provide artificial aspiration to the engine and comprising (i) a turbo bypass configured to bypass exhaust gas past the turbocharger and (ii) a turbo brake configured to close a vane of the turbocharger; and
a controller including non-transitory instructions executable to:
determine a desired amount of the artificial aspiration for the engine based on an operating condition of the engine, and
control the supply of the artificial aspiration by the electrical-mechanical supercharger and the turbocharger to supply the determined desired amount of the artificial aspiration to the engine by controlling each of (i) the electric motor, (ii) the clutch, (iii) the turbo bypass vane, and (iv) the turbo brake, based on the desired amount of artificial aspiration having been determined.

16. The system of claim 15, further comprising at least one of source control valves configured to regulate the supply of the artificial aspiration by the electrical-mechanical supercharger and the turbocharger to the engine,
wherein the controller controls the at least one of the source control valves.

* * * * *